May 1, 1934.  H. J. GRAHAM ET AL  1,957,062
BEARING MOUNTING
Filed Feb. 18, 1931  2 Sheets-Sheet 1

Inventor
HERBERT J. GRAHAM
LEWIS A. DARLING
By Leon Nelson
Attorney.

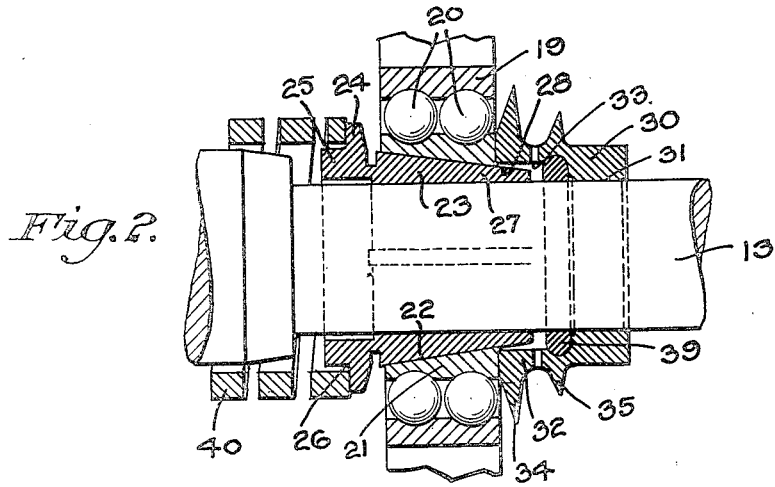
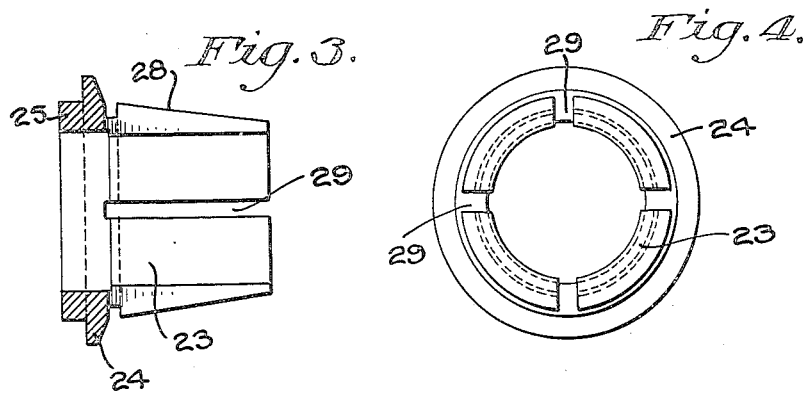
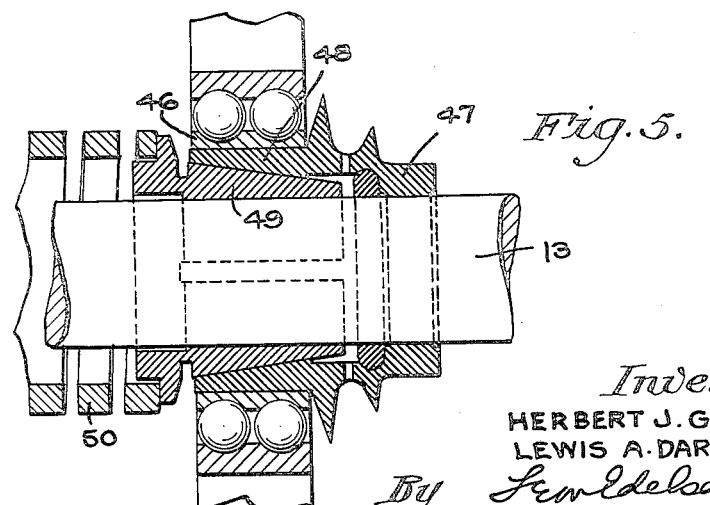

Patented May 1, 1934

1,957,062

UNITED STATES PATENT OFFICE 1,957,062

BEARING MOUNTING

Herbert J. Graham and Lewis A. Darling, Philadelphia, Pa., assignors to Electric Service Supplies Company, Philadelphia, Pa., a corporation of Pennsylvania Application February 18, 1931, Serial No. 516,581

4 Claims. (Cl. 308—236)

This invention relates generally to turbo-generators for locomotive headlights and more particularly to an improved construction of anti-friction bearing assembly for rotatably supporting the turbo-generator shaft.

In United States Patent No. 1,749,247, granted March 4, 1930, there is disclosed a turbo-generator unit of the type illustrated in the accompanying drawings and which is characterized by the provision of a steam turbine and a generator, directly coupled by means of a shaft extending through an intermediate casing within which the governor mechanism and its associated parts are housed. This intermediate casing is secured to the generator casing or housing through the intervention of a partitioning diaphragm or plate provided centrally thereof with a journal box and within which latter is mounted an anti-friction bearing for the turbo-generator shaft. While the present invention is concerned primarily with improvements in the means for mounting this anti-friction bearing in operative relation with respect to the shaft, it is to be understood that it is within the contemplation of this invention that the principles of the same may be employed in connection with arrangements other than that illustrated in the accompanying drawings and that invention is not to be limited to the specific arrangement to be hereinafter more particularly described.

In the arrangement shown in Patent No. 1,749,247 aforesaid, it will be observed that a substantially cylindrical sleeve is interposed between the inner race of the bearing assembly and the turbo-generator shaft, this sleeve being provided with integral annular fins for preventing the creepage of lubricant into the generator casing. In order to effect the necessary coaxial relation between the inner bearing race, the sleeve and the shaft, there must be sufficient dimensional tolerance to permit these parts to be slipped together into the assembled relationship shown. Due to this tolerance, however, it is a difficult matter to insure an effective driving connection between the shaft, the sleeve and the inner bearing race of the anti-friction bearing. Not only is it difficult to initially obtain this positive driving connection between the shaft and said sleeve, but through continued operation of the shaft within its journal box we have found that the parts tend to wear in consequence of which there is a tendency toward axial misalignment between the shaft and the inner bearing race. This results not only in excessive wear and noise between the parts immediately associated with or surrounding the anti-friction bearing but also causes the generator commutator to revolve eccentrically with respect to the axis of rotation of the turbo-generator unit, thus establishing undesirable voltage variations and also at the same time introducing excessive arcing at the commutator brushes.

It is among the principal objects of the present invention to overcome the aforementioned difficulties by the provision of a sleeve which is so designed that when interposed between the shaft and the inner bearing race a wedging action is occasioned to not only effect a more positive connection between said shaft and the inner bearing race but to also insure against axial misalignment therebetween.

Still another object of the invention is the provision of a tapered sleeve having a plurality of circumferentially spaced slots extending axially from the inner end thereof which is adapted, when interposed between the inner bearing race and the shaft, to exert a constant binding or clamping action upon the shaft in such manner as to effectually preclude relative rotation as well as axial misalignment between said inner race and the shaft during the operation of the latter, said race being in turn in frictional engagement with a member which is arranged in embracing relation with respect to and rotatable with the shaft for preventing the creepage of oil axially of the shaft into the generator.

A still further object of the invention is the provision of a spring-pressed sleeve which is so arranged intermediately of the shaft and the inner bearing race as to automatically compensate for any wear or looseness which may take place between said shaft and bearing race, the sleeve having operatively associated for rotation therewith means for preventing the entrance of lubricant into the interior of the generator.

Other objects of the invention and advantages thereof such as those relating to its simplicity of construction, its efficiency in use and the facility with which the component parts thereof may be assembled in operative relation or removed for purposes of replacement or examination will be apparent more fully hereinafter.

The invention consists substantially in the combination, construction, location and relative arrangement of parts, all as will appear in the following description, as shown in the accompanying drawings, and as finally pointed out in the appended claims. In the said accompanying drawings:—

Figure 2 is an enlarged longitudinal sectional view of the bearing assembly embodying the features of the present invention;

Figure 3 is an elevational view of the tapered sleeve per se;

Figure 4 is an end view of said sleeve; and

Figure 5 is a longitudinal sectional view of a somewhat modified construction of bearing assembly.

Figure 1:
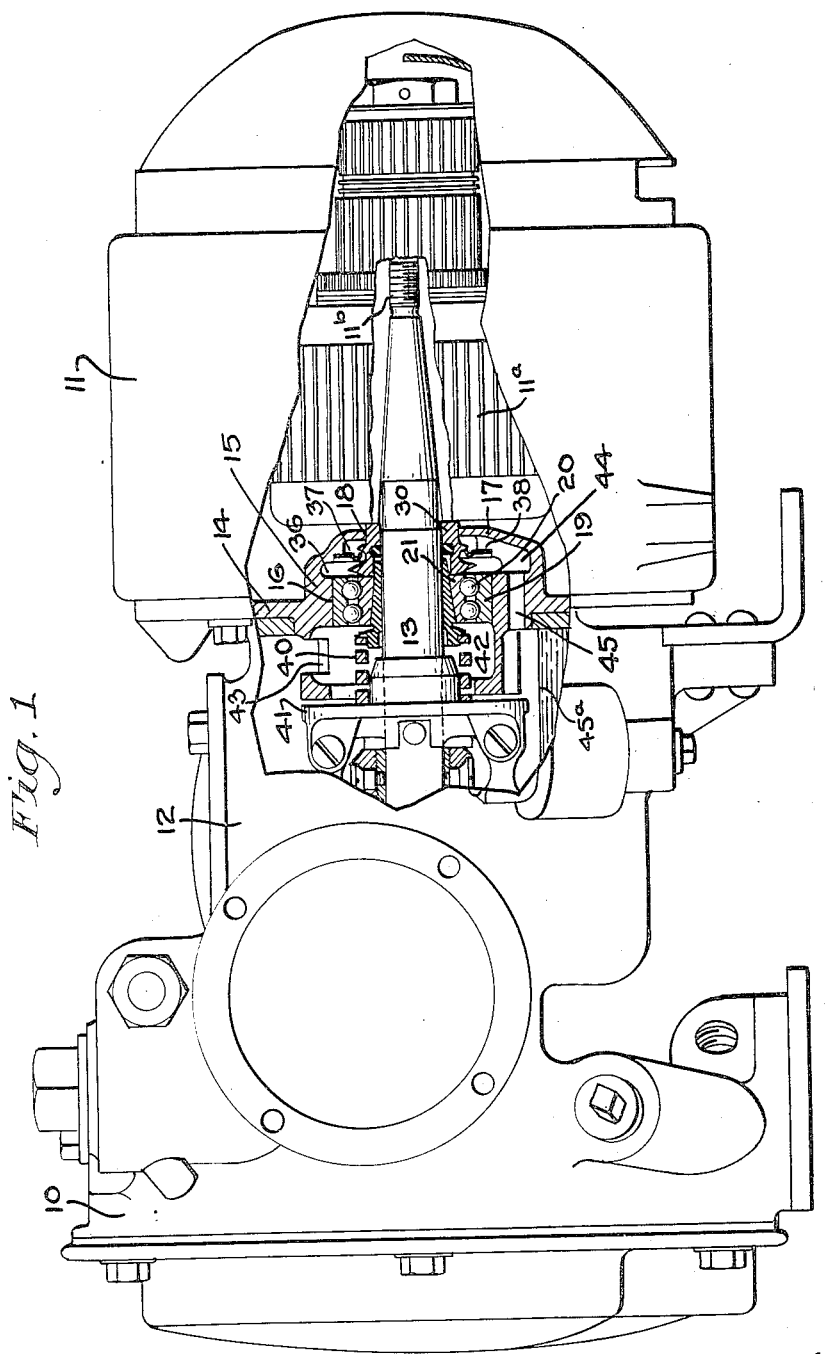
Figure 1 is an elevational view of a turbo-generator unit, a portion of which is sectionalized to more clearly show the embodiment of the present invention in said unit.

Referring now to the drawings and more particularly to Figures 1 to 4, it will be seen that the present invention has been incorporated in a turbo-generator unit consisting of a turbine casing 10 enclosing a rotor, a generator casing 11 enclosing the generator armature and its associated parts and an intermediate casing 12 enclosing the shaft 13 which directly couples the turbine to the generator for transmission of power from the former to the latter. The armature 11$^a$ is threadedly secured, as at 11$^b$, to the shaft 13 and is thus adapted to be axially adjusted along the shaft within certain limits. Also housed within the intermediate casing 12 is the speed governor and its associated parts as well as a main lubricant receiving chamber.

The intermediate casing 12 is secured to the generator casing 11 through the intervention of a diaphragm or plate 14 constituting a partition or separating wall between the interiors of the casings 12 and 11. This partition or plate 14 is centrally provided with a substantially cylindrical enlargement 15 the opposite ends of which respectively extend beyond the opposite sides of the plate 14. The enlargement 15 constitutes the journal box for the shaft 13 and is provided with a substantially cylindrical bore 16 which is coaxial with the shaft 13 and through which the latter extends for rotation therein. That end of the journal box member 15 which projects interiorly of the generator casing 11 is provided with an axially offset, substantially radially extending flange or web 17 which is centrally apertured, as at 18, to permit the passage therethrough of the shaft 13.

Fitted within the bore 16 of the journal box is the outer bearing race 19 of an anti-friction bearing assembly, which latter includes as component parts thereof, in addition to said outer race, a plurality of ball bearings 20 and an inner bearing race 21. As appears most clearly in Figures 1 and 2 this inner bearing race 21 is provided with a tapered bore 22, the enlarged end of which preferably presents toward the turbine end of the unit. Adapted to be interposed between the inner bearing race 21 and the shaft 13 is a sleeve 23 one end of which is provided with a radially extending flange 24 and with an axially extending flange 25 to provide a circumferentially extending shouldered seat 26. The body 27 of this sleeve 23 is of somewhat greater axial length than that of the bearing race 21 and is provided with an external tapered surface 28, the taper of which is complemental to the internal taper of the race 21. Provided in the tapered body portion 27 of the sleeve 23 are a plurality of circumferentially spaced slots 29 extending axially of the sleeve from the right hand end thereof to a point terminating short of the left hand or flanged end thereof.

Arranged in embracing relation with respect to the shaft 13 is an oil impelling member 30. This member 30 is provided with a cylindrical portion having a bore 31 within which the shaft 13 is adapted to be snugly fitted, the external surface of this cylindrical portion being in turn rotatably received within the central bore 18 of the radially extending web 17 which constitutes an integral part of the journal box 15. The oil impelling member 30 is provided with an axially extending portion 32 having an enlarged internal bore 33 and a pair of axially spaced annular fins 34 and 35 upon the external surface thereof. At this point it will be observed that the generator end of the journal box 15 is provided in the internal surface thereof with a pair of annular cavities 36 and 37, these cavities being separated by means of a disc 38 which is centrally apertured to permit the insertion therethrough of the oil impeller 30.

When the parts are assembled in the relation shown particularly in Figure 1, it will be observed that the annular fin 34 lies substantially in the plane of the annular groove 36, while the smaller annular fin 35 lies substantially in the plane of the smaller annular groove 37. It will also be observed that the slotted end of the sleeve 23 terminates within the enlarged bore 33 of the impeller member 30 (see particularly Figure 2). Suitably disposed within the enlarged bore 33 of the impeller member immediately adjacent the inner end of said bore is a packing 39 of felt or other such material for preventing the creepage of oil axially of the shaft 13 toward the generator end thereof.

The impeller member 30 is preferably maintained in frictional engagement with the inner bearing race 21 through the intervention of the generator armature 11$^a$ which is threadedly secured to the shaft 13. The slotted sleeve 23 is, on the other hand, maintained in the operative position shown in Figures 1 and 2 by means of a relatively heavy coiled spring 40 which is arranged in embracing relation with respect to the shaft 13 and the opposite ends of which respectively abut the radial flange 24 of the sleeve 23 and the axially shiftable clutch plate 41 of the centrifugal speed governor (not fully shown). Obviously, any suitable means may be employed for varying the compressive force exerted by the spring 40 against the sleeve 23. In one instance, this may be accomplished by axially adjusting the armature along the shaft 13 in the direction of the turbine unit in consequence of which the impeller, bearing races and sleeve 23 may be shifted as a unit against the spring 40 thereby increasing the compressive force of the latter.

The left hand end of the journal box 15 is provided with an enlarged cavity 42 constituting a reservoir for lubricant collected therein through the opening 43 in the top thereof. The oil which is thus collected in the reservoir 42 is maintained at a level sufficiently high to permit the revolving parts of the anti-friction bearing to travel therein, the lubricant passing through and between the bearing races 19 and 21 into the right hand oil passage 44 formed in the journal box and thence, by way of the passage 45, into the main reservoir 45$^a$ located in the intermediate casing 12. Any excess lubricant which may tend to creep axially of the sleeve 23 or be discharged from between the moving parts of the anti-friction bearing, will be thrown radially from the fin 34 by centrifugal force and directed against the walls of the annular cavity 36, thence returning to the bottom of this latter cavity for subsequent return to the main oil reservoir. The smaller fin 35 constitutes an auxiliary means for preventing the entrance of oil into the generator casing, the oil collected by this fin 35 being cast by centrifugal force against the walls of the annular cavity 37 for subsequent return by way of the passages 44 and 45 to the main reservoir. The disc 38 and the packing 39 serve as additional precautions to preclude the entry of oil into the generator casing.

It will be apparent that in the arrangement just described, the interposed slotted sleeve 23 effectually precludes any tendency for the shaft 13 to become axially misaligned with respect to the axis of rotation of the anti-friction bearing. Through the action of the coiled compression spring 43, a wedging action is imparted to the sleeve 23 to automatically compensate for any wear or play which may take place between the parts which are intended to and should rotate in unison. This results not only in the elimination of knocks between these parts but also eliminates to a great extent one of the principal causes of arcing at the commutator brushes as well as objectionable voltage variations. In addition to the foregoing, a more positive driving connection between the shaft and the inner bearing race is at all times assured in consequence of which the slippage between the impeller 30 and the shaft 13 is reduced to a veritable minimum, it being understood in this connection that rotation is imparted to the impeller 30 by reason of the fact that it is clamped between the armature 11ª at one end thereof and the bearing race 21 at the opposite end thereof.

In Figure 5 we have illustrated a modified arrangement in order to permit the use of the present invention in conjunction with an anti-friction bearing having a straight bore inner race. In this modified arrangement it will be observed that the inner race 46 of the ball bearing is provided with a substantially cylindrical bore as distinguished from the tapered bore of the inner race shown in Figures 1 and 2. The impeller member 47 differs from that hereinbefore described in the fact that it is provided with an axial extension 48 the external surface of which is substantially cylindrical shape and adapted to be snugly received within the bore of the inner race 46. The internal surface of the extension 48 of the impeller member is, however, tapered to complement the taper of the slotted sleeve 49, this latter being identical in construction with the sleeve 23 hereinbefore described. In the arrangement of Figure 5 the slotted tapered sleeve 49, through the action of the coiled compression spring 50, is forced axially along the shaft 13 to effect a positive frictional engagement with the impeller member 47 as well as with the shaft 13, thereby insuring a more positive fit between the shaft, the impeller member and the inner bearing race than has been attained heretofore and wherein all play or looseness between these parts is automatically and effectively eliminated.

It will be understood that various changes and improvements may be made in the invention as hereinbefore described without departing from the real spirit or general principles thereof and it is accordingly intended to claim the same broadly, as well as specifically, as indicated in the appended claims.

What is claimed as new and useful is:—

1. In a bearing mounting, in combination, an anti-friction bearing assembly having a central bore of greater diameter than that of a shaft adapted to be projected therethrough, a sleeve fitted within said bore and having a tapered internal surface, a second sleeve having an externally tapered surface interposed between said internally tapered sleeve and the shaft, one of said sleeves being provided with one or more slots extending axially from the inner end thereof, the outer of said sleeves being provided with a radially extending flange adapted to snugly fit the shaft, and means provided within said outer sleeve and adjacent said flange for precluding the passage of oil axially of the shaft and exteriorly of said flange.

2. In a bearing mounting, an anti-friction bearing assembly through the bore of the inner race of which a shaft is adapted to be projected, a plurality of longitudinally tapered, transversely arcuated wedge elements interposed in circumferentially spaced relation between the shaft and the bearing race, a spring mounted on the shaft and exerting pressure against said wedge elements whereby to force the latter axially between the shaft and bearing race, and means operatively associated with said inner race to constitute a fixed abutment therefor and for preventing the creepage of lubricant axially of the shaft and exteriorly of the bearing assembly.

3. In a bearing mounting, an anti-friction bearing assembly through the bore of the inner race of which a shaft is adapted to be projected, a plurality of longitudinally tapered, transversely arcuated wedge elements interposed in circumferentially spaced relation between the shaft and the bearing race, a spring mounted on the shaft and exerting pressure against said wedge elements whereby to force the latter axially between the shaft and bearing race, and axially adjustable means on the shaft adapted to abut one end of the bearing and buttress it against the spring pressure, said means being further adapted to prevent the creepage of lubricant axially of the shaft and exteriorly of the bearing assembly.

4. In a bearing mounting, in combination, an anti-friction bearing assembly having a central bore of greater diameter than that of a shaft adapted to be projected therethrough, a sleeve fitted within said bore and having a tapered internal surface, said sleeve being provided at one end thereof with a radially extending flange adapted to snugly fit the shaft, a second sleeve having an externally tapered surface interposed between said internally tapered sleeve and the shaft, and means tending constantly to urge said sleeves axially toward each other.

HERBERT J. GRAHAM.
LEWIS A. DARLING.